United States Patent
Fuchs

(10) Patent No.: US 11,852,608 B2
(45) Date of Patent: Dec. 26, 2023

(54) FLUID MEASURING DEVICE

(71) Applicants: Buerkert Werke Gmbh & Co. KG, Ingelfingen (DE); Burkert S.A.S., Triembach-au-Val (FR)

(72) Inventor: Yannick Fuchs, Ingelfingen (DE)

(73) Assignees: BUERKERT WERKE GMBH & CO. KG; BURKERT S.A.S.

( * ) Notice: Subject to any disclaimer, the term of this patent is extended or adjusted under 35 U.S.C. 154(b) by 121 days.

(21) Appl. No.: 17/558,791

(22) Filed: Dec. 22, 2021

(65) Prior Publication Data
US 2022/0196601 A1 Jun. 23, 2022

(30) Foreign Application Priority Data
Dec. 23, 2020 (FR) ..................... 20/14001

(51) Int. Cl.
*G01N 29/024* (2006.01)
*G01N 29/22* (2006.01)
(Continued)

(52) U.S. Cl.
CPC ......... *G01N 29/024* (2013.01); *G01N 29/221* (2013.01); *G01N 29/34* (2013.01); *G01N 29/36* (2013.01); *G01N 2291/102* (2013.01)

(58) Field of Classification Search
CPC .... G01N 29/024; G01N 29/221; G01N 29/34; G01N 29/36; G01N 2291/102;
(Continued)

(56) References Cited

U.S. PATENT DOCUMENTS 4,801,835 A * 1/1989 Nakaya ................ B06B 1/0629
310/366
2004/0163478 A1 8/2004 Xu et al.
(Continued)

FOREIGN PATENT DOCUMENTS

| DE | 102019110514 A1 | 10/2019 |
| DE | 102018125923 A1 | 4/2020 |
| GB | 2582826 A | 7/2020 |

OTHER PUBLICATIONS

Zhu Qifeng et al.: "A Piezoelectric Micro-Machined Ultrasonic Transducer Array Based on Flexible Substrate"; 2018 IEEE 13th Annual International Conference on Nano/Micro Engineered and Molecular Systems (NEMS), Apr. 22, 2018, pp. 345-348.
(Continued)

*Primary Examiner* — Xin Y Zhong
(74) *Attorney, Agent, or Firm* — Dilworth IP, LLC

(57) ABSTRACT

A fluid measuring device for determining at least one characteristic property of a fluid includes a measuring tube having a fluid duct and a measuring section in which an area of a measuring tube wall is configured as a waveguide for surface acoustic waves which forms an interface to the fluid. At least two piezoelectric transducers are arranged in direct contact with an outer surface of the waveguide and one of which serves as a transmitter for exciting acoustic waves and at least one as a receiver for receiving acoustic waves. Acoustic waves excited by the transmitter can propagate as a volume wave through the fluid, and the piezoelectric transducers are configured to be elastically flexible while retaining their function in that the piezoelectric transducers have strip-shaped piezoelectric elements arranged parallel to each other, are rigid per se and between which a respective layer of an elastic material is arranged.

21 Claims, 8 Drawing Sheets

(51) Int. Cl.
*G01N 29/34* (2006.01)
*G01N 29/36* (2006.01)

(58) Field of Classification Search
CPC ............ G01N 29/022; G01N 29/2462; G01N 2291/0423; G01N 29/2437; G01N 2291/022; G01F 1/662; G01F 1/668
See application file for complete search history.

(56) References Cited

U.S. PATENT DOCUMENTS

| | | | | |
|---|---|---|---|---|
| 2016/0327419 | A1* | 11/2016 | Hellevang | G01F 1/667 |
| 2019/0331642 | A1* | 10/2019 | Fuchs | G01N 29/022 |
| 2021/0187550 | A1* | 6/2021 | Tada | H10N 30/092 |
| 2021/0381866 | A1* | 12/2021 | Bauernschmitt | G01N 29/2412 |
| 2022/0163487 | A1* | 5/2022 | Kemp | G01N 29/223 |

OTHER PUBLICATIONS

Lee Jin-Hyung et al.: "Flexible Piezoelectric Micromachined Ultrasonic Transducer (pMUT) for Application in Brain Stimulation"; Microsystem Technologies, Berlin, DE, vol. 23, No. 7, Apr. 29, 2016, pp. 2321-2328.

* cited by examiner

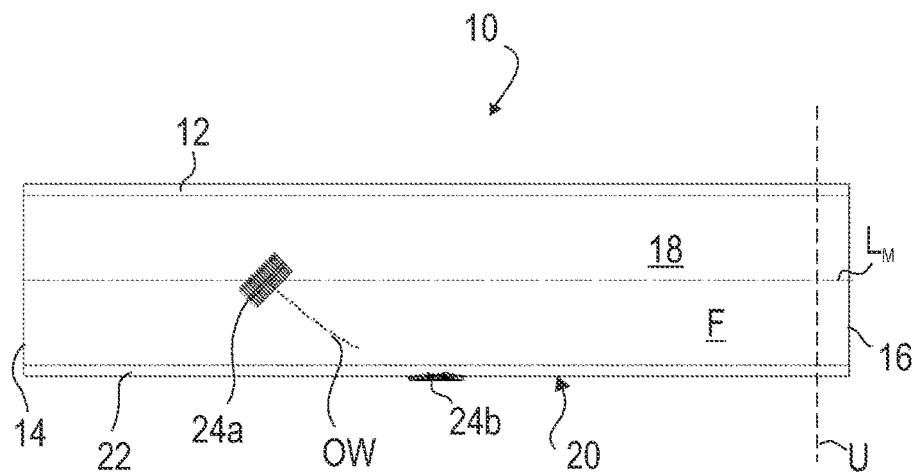
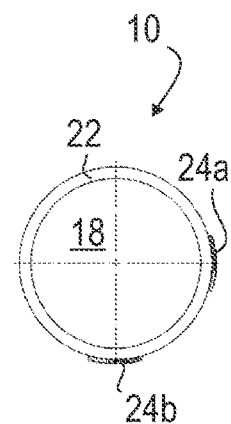
Fig. 4A  Fig. 4B
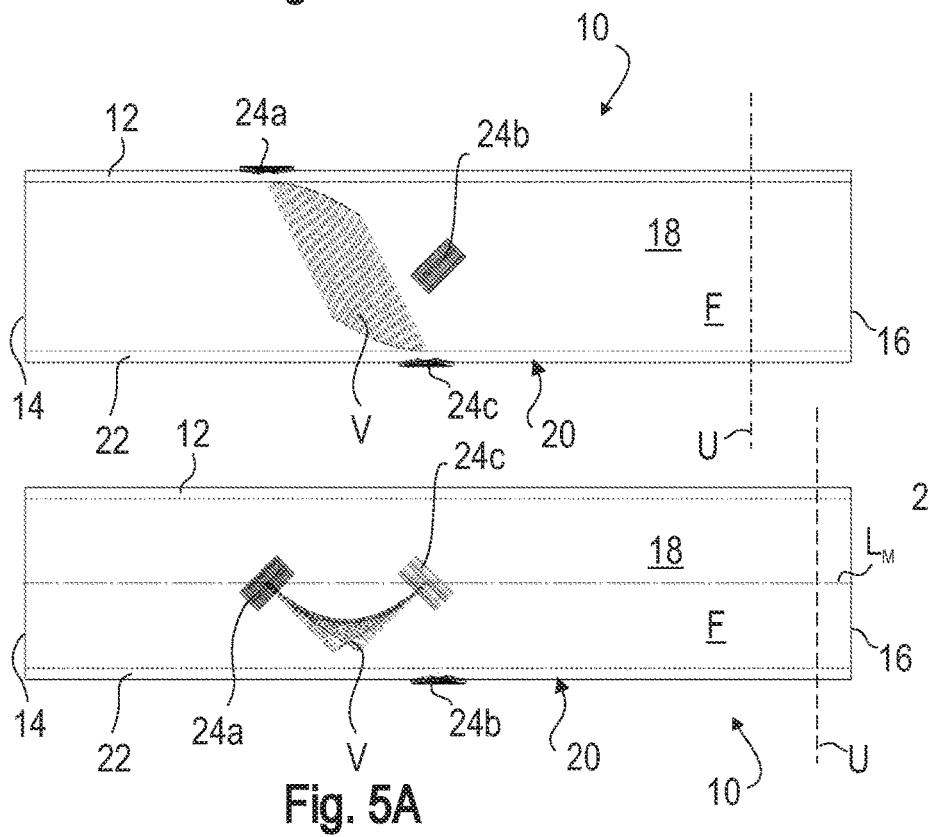
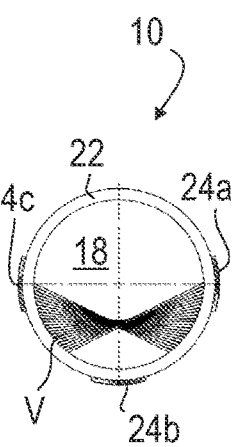
Fig. 5C
Fig. 5A  Fig. 5B

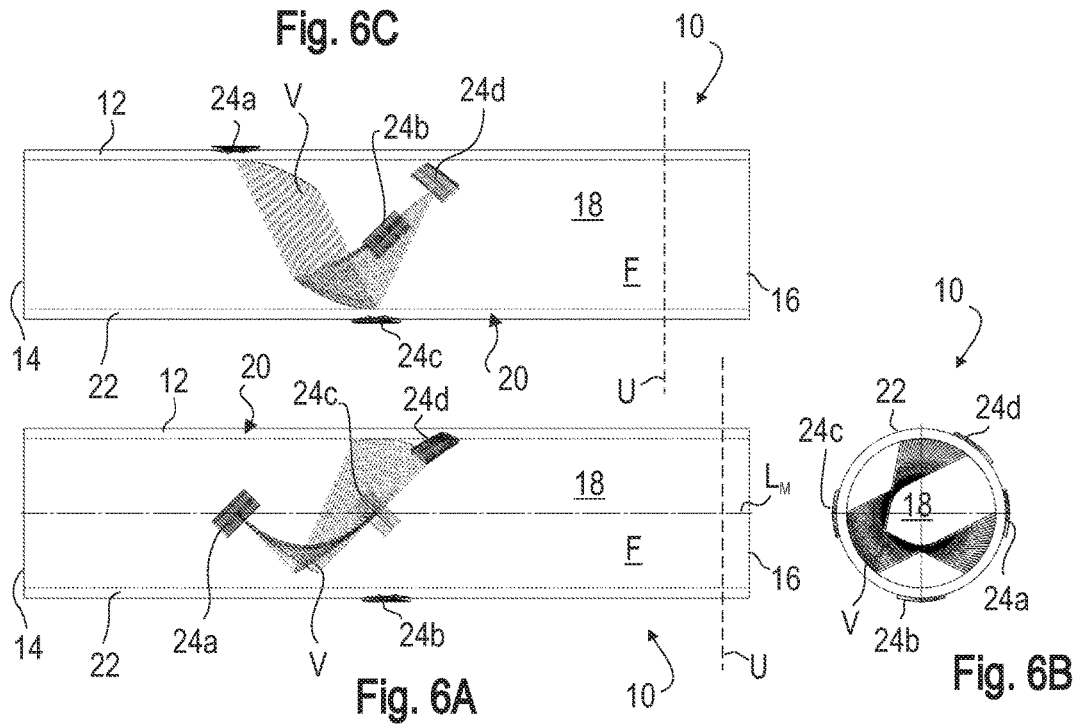
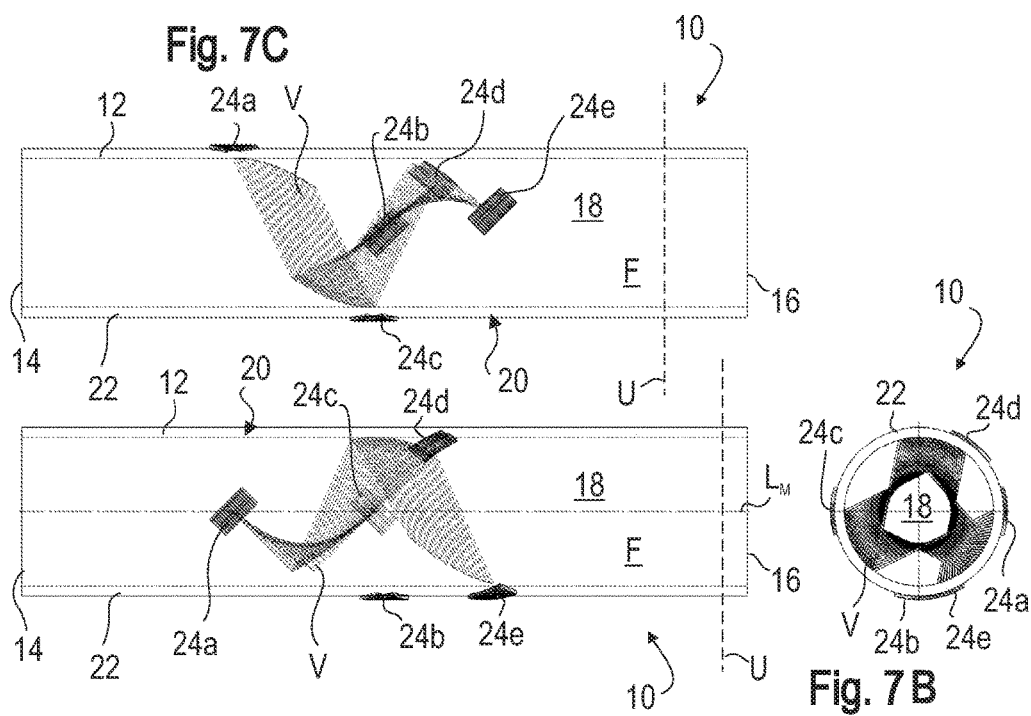

FLUID MEASURING DEVICE

FIELD OF THE INVENTION

The invention relates to a fluid measuring device for determining at least one characteristic property of a fluid.

The invention in particular relates to a fluid measuring device for determining one or more characteristic properties of a liquid flowing therethrough. The properties of the fluid include, for example, the concentration, the density, the viscosity, the sound velocity, the flow velocity, the flow rate, the temperature and/or the homogeneity thereof.

BACKGROUND

Document DE 10 2019 110 514 A1 discloses a fluid measuring device which serves to measure certain properties of the fluid flowing in a fluid duct using acoustic waves. To this end, surface acoustic waves (SAW) are excited in a waveguide formed by part of the wall of the fluid duct, the type and frequency of which are selected such that a partial decoupling into the fluid which is in direct contact with the waveguide occurs. Part of the surface acoustic waves in the waveguide is thus coupled into the fluid as longitudinal volume sound waves and passes therethrough.

On their way through the fluid, the sound waves are reflected at least once at an opposite wall of the fluid duct so that they hit the waveguide again, where part of these volume waves is again coupled into the wave guide as surface acoustic waves and continues to travel therein. A characteristic signal the temporal intensity course of which (including the time delay with respect to the signal emitted by the transmitter) allows conclusions to be drawn about characteristic properties of the fluid is thus produced at a receiver which is arranged on the waveguide at a distance from a transmitter.

Piezoelectric transducers are used as transmitters and receivers, which are usually attached to the measuring tube on flat contact surfaces. However, under certain loads, such as high pressure or strong thermal stress, the piezoelectric transducers can break, in particular if they are large-area transducers which provide a particularly high measurement accuracy.

It is therefore the object of the invention to provide a fluid measuring device in which the aforementioned problems are avoided.

SUMMARY

The invention provides a fluid measuring device for determining at least one characteristic property of a fluid, including a measuring tube having a fluid duct through which the fluid can flow and which has a measuring section in which at least an area of a measuring tube wall is configured as a waveguide for surface acoustic waves which forms an interface to the fluid, and at least two piezoelectric transducers which are arranged in direct contact with an outer surface of the wave guide. One of the piezoelectric transducers serves as a transmitter for exciting acoustic waves in the waveguide and at least one as a receiver for receiving acoustic waves. Acoustic waves excited by the transmitter can propagate at least in sections as a volume wave through the fluid, and the piezoelectric transducers are configured to be elastically flexible while retaining their function in that the piezoelectric transducers have a plurality of strip-shaped piezoelectric elements which are arranged parallel to each other, are rigid per se and between which a respective layer of an elastic material is arranged.

As in the fluid measuring device according to the invention, the piezoelectric transducers are configured to be elastically flexible, there is no risk of breakage even under high loads, even in case of a certain deformation of the measuring tube. The realization of large-area piezoelectric transducers for systems with particularly high measurement accuracy also poses no problem. In addition, due to their flexibility, the piezoelectric transducers can adapt ideally to a curvature of, for example, a circular-cylindrical measuring tube, so that machining of the measuring tube, as is done in the prior art to create a flat contact surface for the transducers, is not necessary in the configuration according to the invention. This simplifies manufacturing, which in turn has a beneficial effect on the manufacturing costs.

It should be noted here that, within the meaning of the invention, a strip-shaped piezoelectric element is to be understood as a thin, plate-like piezoelectric element which has a preferably elongated shape.

The piezoelectric transducers can be bonded to the measuring tube wall, as a result of which the fluid measuring device can be manufactured in a particularly simple and cost-effective manner.

The elastic material may be an elastomer or casting compound.

The strip-shaped rigid piezoelectric elements and the layers of elastic material can be arranged therebetween substantially form a cuboid in a non-bent state. In particular, the length of the cuboid is at most ten times the width thereof, and the height is approximately one tenth of the width. Alternatively, it is also possible to use transducers having a square base.

In a variant, the strip-shaped rigid piezoelectric elements and the layers of elastic material arranged therebetween alternate as seen in the longitudinal direction of the cuboid, and each of the strip-shaped rigid piezoelectric elements extends over the entire width of the cuboid. In this way, piezoelectric transducers are obtained which have the desired flexibility and have proved in tests to be particularly suitable for generating a large-amplitude surface acoustic wave in the measuring tube wall.

In an alternative configuration, the strip-shaped rigid piezoelectric elements and the layers of elastic material arranged therebetween alternate as seen both in the longitudinal direction and in the transverse direction of the cuboid. This results in a structure of numerous small rectangular piezoelectric elements separated from each other by a grid of elastic material, which improves the flexibility of the piezoelectric transducers.

A particularly simple and break-proof configuration is obtained if the piezoelectric transducers have an elastic printed circuit board or printed circuit board foil to which the strip-shaped piezoelectric elements are fastened and electrically contacted. Preferably, when assembling the piezoelectric transducers, the cuboids composed of the strip-shaped piezoelectric elements are first bonded to the measuring tube wall with layers of elastic material arranged therebetween, and then the flexible printed circuit board is attached to the other side of the cuboids.

A configuration in which the piezoelectric transducers each have two electrodes which are attached to the elastic printed circuit board or printed circuit board foil and, in particular, are arranged such that the acoustic wave is coupled into or received from the measuring tube via the longest side of the piezoelectric transducer has proven to be particularly favorable in terms of production technology.

In an embodiment, each piezoelectric transducer has at least one pair of electrodes, wherein a first electrode of the pair of electrodes is arranged on a side of the piezoelectric elements facing away from the measuring tube and the second electrode of the pair of electrodes is arranged on a side of the piezoelectric elements facing the measuring tube and opposite the first electrode, and wherein a voltage is applied between the first electrode and the second electrode of the pair of electrodes during operation of the piezoelectric transducer. In a top view of the transducer, the two electrodes of a pair of electrodes thus lie exactly one above the other. In this configuration, when an alternating voltage is applied, the piezoelectric elements oscillate mainly in the direction perpendicular to the measuring tube wall, which is particularly favorable for excitation of a surface wave in the underlying measuring tube wall.

Each piezoelectric transducer may have at least two pairs of electrodes, in particular wherein the electrodes of different pairs of electrodes arranged on the same side of the piezoelectric elements are short-circuited. In this way, at least at the points where the pairs of electrodes are provided, the piezoelectric elements oscillate in phase in a type of bending vibration which has proved to be particularly suitable for generating SAW in the measuring tube wall. The distance between the pairs of electrodes corresponds in particular to the wavelength of the surface acoustic wave to be generated.

In an embodiment, all electrodes run parallel to a longitudinal axis of the piezoelectric transducer, and at least two pairs of electrodes are at different distances from the longitudinal axis, in particular wherein one pair of electrodes is arranged in an edge region and one pair of electrodes is arranged in a central region of the piezoelectric transducer. This configuration results in an asymmetric propagation of the surface acoustic waves emitted by the transducer; in particular, an amplitude up to 50% greater is obtained on the side of the transducer on which no pair of electrodes is arranged. Therefore, the acoustic wave coupled into the measuring tube via this side is advantageously used for measurement.

The measuring tube wall may have a substantially constant wall thickness throughout the measuring section, which further simplifies fabrication. The wall thickness may even be less than in known fluid measuring devices, since machining to produce flat contact surfaces for the piezoelectric transducers can be dispensed with. This is particularly relevant for measuring tubes having a constant thin measuring tube wall, as removal of material by milling is not or hardly possible here.

In one configuration, the measuring tube is configured to be cylindrical on the inside, and at least three piezoelectric transducers are provided, one of which serves as a transmitter for exciting acoustic waves in the waveguide and at least two serve as receivers for receiving acoustic waves. The piezoelectric transducers rest in a planar manner against the measuring tube wall and, with respect to the center line thereof, are each arranged at an acute angle to the longitudinal extension direction of the measuring tube and are also arranged offset from each other in the circumferential direction and in the longitudinal extension direction of the measuring tube.

This arrangement of the transducers makes it possible to achieve a particularly long measurement path both for a measuring tube having a round cross-section and for a measuring tube having an angular cross-section, so that a particularly large proportion of the fluid is taken into account in the measurement.

A course of the volume waves in the fluid which is particularly favorable for the measurement can be achieved if the individual piezoelectric transducers, with respect to the respective center line thereof, are arranged at different acute angles to the longitudinal extension direction of the measuring tube.

According to another embodiment, a first receiver is arranged on the measuring tube wall so as to receive the signal of an acoustic wave which is transmitted directly via the measuring tube wall serving as a waveguide, and a second receiver is arranged on the measuring tube wall so as to receive the signal of an acoustic wave which has propagated in sections as a volume wave through the fluid without having been reflected at the measuring tube wall. The first receiver serves as a reference, while the second receiver measures a first wave group or a first wave order.

In a further development, at least one additional receiver is provided and is arranged on the measuring tube wall so as to receive the signal of an acoustic wave which has propagated in sections as a volume wave through the fluid and has been reflected at least once at the measuring tube wall. This receiver or these (several) receivers thus detect(s) a second wave group or higher wave order, each receiver in particular receiving the waves of exactly one wave group by an appropriate arrangement on the measuring tube.

In one configuration of the invention, at least five piezoelectric transducers are provided. In this way, three (or more) wave groups or wave orders are measured.

A signal characteristic of the volume waves, which has been found to be particularly favorable in tests, results from the fact that the piezoelectric transducers are arranged along the measuring tube such that two successive reflection regions of the volume wave in the axial direction of the measuring tube are arranged offset from each other by less than 180° in the circumferential direction, preferably by approximately 125° to 130°.

In a configuration, the piezoelectric transducers are arranged along the measuring tube, which is circular cylindrical in the measuring section, such that the volume wave in the fluid travels substantially along a helical line. For this purpose, the transducers are also arranged on a kind of helical line around the measuring tube wall. With such a helical waveform, particularly many portions of the fluid are included in the measurement.

A central area of the fluid duct can be omitted by the volume wave. In particular, the diameter of the central area corresponds to half the diameter of the fluid duct. Especially at the transition from turbulent/unstable to laminar/stable flows and vice versa, or in case of an asymmetric flow profile, measuring the center can lead to significant measurement errors. Since unstable flow profiles often appear directly behind branches or similar, a large inflow path must be selected in known fluid measuring devices for the most accurate measurement possible, so that the flow in the area of the measurement is mainly present again as a stabilized flow profile. A measurement outside the center therefore enables a high measurement accuracy with a smaller inflow path. Thus, the system according to the invention can be arranged, for example, directly behind T-tube sections or angled, curved, or bent tubes.

According to a further embodiment, the measuring tube in the measuring section is substantially rectangular in cross-section and has flat sides to which the piezoelectric transducers are attached. This refers both to the inner cross-section, i.e., the cross-section of the fluid duct, and to the outer cross-section of the measuring tube, wherein the actual "corners" may be rounded. A substantially square cross-section is of course also possible, again with rounded corners if desired.

A high measurement accuracy can be achieved if the piezoelectric transducers extend over at least 90% of the width of the fluid duct. Due to the elastically flexible design of the piezoelectric transducers, transducer lengths of up to 80 mm or more are possible.

A fluid measuring device which can be used in a variable manner is obtained if at least two of the piezoelectric transducers can be operated both as transmitters and receivers. Such a design enables measurement both in and against the direction of flow.

BRIEF DESCRIPTION OF THE DRAWINGS

FIGS. 4A and 4B show a partially transparent side view and a top view of a front side of the fluid measurement device of FIG. 1, illustrating the course of a surface acoustic wave serving as a reference;

FIGS. 5A to 5C show a partially transparent side view, a top view of a front side, and a top view of a bottom side of the fluid measurement device of FIG. 1, illustrating the course of a first wave group of a volume wave;

FIGS. 6A to 6C show a partially transparent side view, a top view of a front side, and a top view of a bottom side of the fluid measuring device of FIG. 1, illustrating the course of a first and a second wave group of the volume wave;

FIGS. 7A to 7C show a partially transparent side view, a top view of a front side and a top view of a bottom side of the fluid measuring device of FIG. 1, illustrating the course of a first, a second and a third wave group of the volume wave;

DETAILED DESCRIPTION

Figure 1:
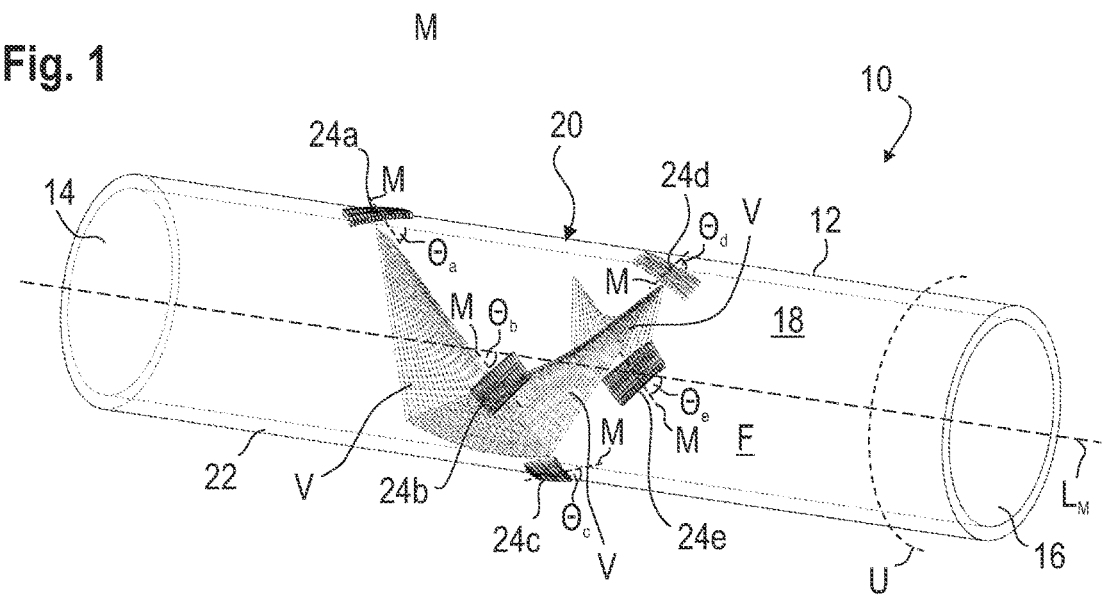
FIG. 1 shows a partially transparent perspective view of a first embodiment of a fluid measuring device according to the invention.

FIGS. 1 to 7 show a fluid measuring device 10 according to the invention. The latter includes a measuring tube 12 having a fluid inlet 14, a fluid outlet 16 and a fluid duct 18 which extends therebetween and through which a fluid F can flow. A central section of the measuring tube 12 serves as a measuring section 20 in which an area of a measuring tube wall 22 is configured as a waveguide for surface acoustic waves OW which forms an interface to the fluid F.

The measuring tube 12, for example, and this is not to be understood in a restrictive manner, has a cylindrical, in particular circular cylindrical cross-section in the measuring section 20 and is also configured to be circular cylindrical on the inside.

On the outside of the measuring tube 12, a total of five piezoelectric transducers 24a, 24b, 24c, 24d, 24e are arranged spaced apart from each other in direct contact with an outer surface of the measuring tube wall 22 (and thus the waveguide). The piezoelectric transducers 24a to 24e are bonded to the measuring tube wall 22.

Figure 2:
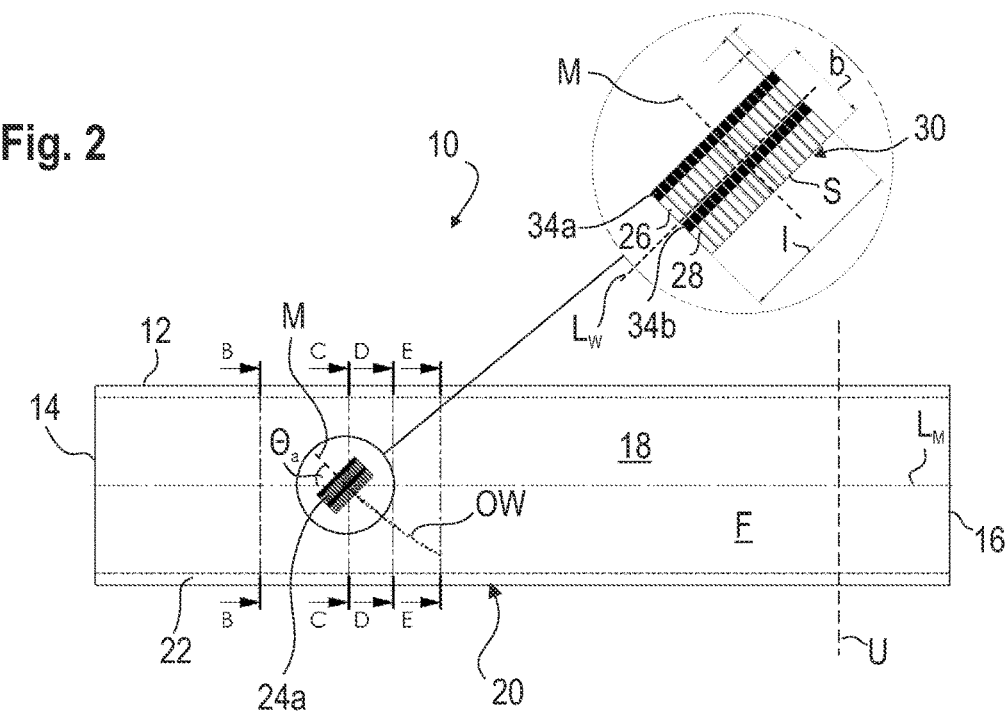
FIG. 2 shows a partially transparent schematic side view of the fluid measuring device of FIG. 1, illustrating the course of a surface acoustic wave.

In order to adapt in a planar manner to the curvature of the measuring tube 12 without the need of flattening the measuring tube 12 by a milling method, the piezoelectric transducers 24a to 24e are configured to be elastically flexible while retaining their function in that they have a plurality of strip-shaped piezoelectric elements 26 which are arranged parallel to each other, are rigid per se and between which a respective layer 28 of an elastic material is arranged (see in particular the enlarged detail in FIG. 2).

The strip-shaped piezoelectric elements 26 are, for example, approximately four to five times as wide (measured in the longitudinal direction of the length l drawn in FIG. 2) as the layers 28 of elastic material, which is an elastomer or casting compound.

Figure 9:
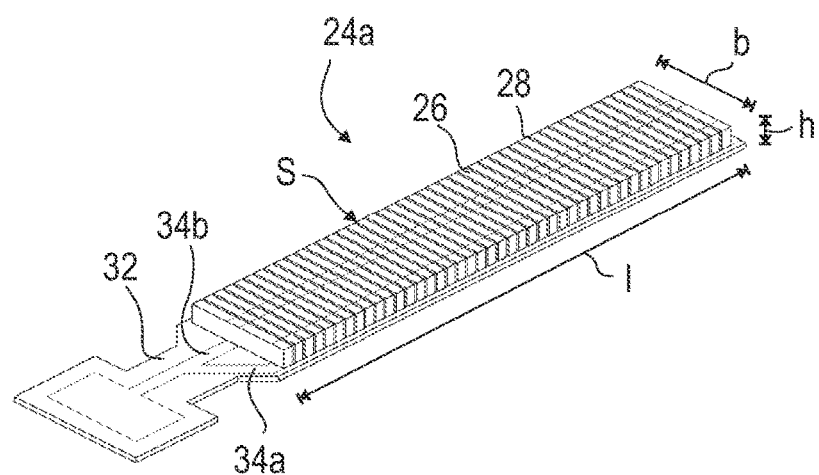
FIG. 9 shows a perspective view of a piezoelectric transducer for a second embodiment of a fluid measuring device according to the invention.

In a non-bent state of the piezoelectric transducers 24a to 24e, the strip-shaped rigid piezoelectric elements 26 and the layers 28 of elastic material arranged therebetween substantially form a cuboid 30, the length l of which is here approximately three times the width b thereof, while the height h of the cuboid 30 is approximately one tenth of the width b (see also FIG. 9). In the configuration shown, the length l of the cuboid 30 is between 5 mm and 15 mm.

The strip-shaped rigid piezoelectric elements 26 and the layers 28 of elastic material arranged therebetween alternate as seen in the longitudinal direction of the cuboid 30, and each of the strip-shaped rigid piezoelectric elements 26 extends over the entire width b of the cuboid 30.

In addition, each piezoelectric transducer 24a to 24e has an elastic printed circuit board 32 or printed circuit board foil, the illustration of which in FIGS. 1 and 2 has been omitted for the sake of clarity. In this respect, reference is made to the illustration of FIG. 9, which shows a piezoelectric transducer 24a used in a further embodiment of the fluid measuring device 10 according to the invention. A corresponding elastic printed circuit board 32 or printed circuit board foil is also provided in the transducers 24a to 24e of FIGS. 1 and 2.

The strip-shaped piezoelectric elements 26 are attached to and electrically contacted on the printed circuit board 32 or printed circuit board foil, for which purpose two electrodes 34a, 34b are respectively provided, which are mounted to the elastic printed circuit board 32 or printed circuit board foil.

The two electrodes 34a, 34b are arranged such that an acoustic wave emitted or received by the respective transducer 24a to 24e is decoupled or coupled into the measuring tube 12 via the longest side S of the piezoelectric transducer 24a to 24e.

Figure 14:
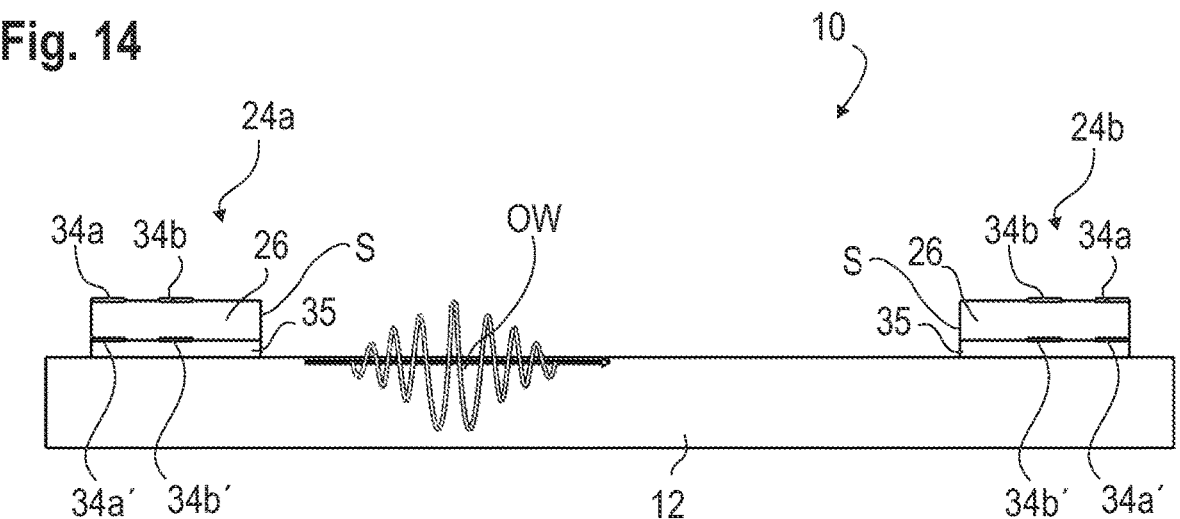
FIG. 14 shows a partial longitudinal sectional view of a measuring tube with two piezoelectric transducers, which are used in particular in the fluid measuring device of FIGS. 1 to 8.

FIG. 14 exemplarily shows the arrangement of two piezoelectric transducers 24a and 24b on the measuring tube wall 22, wherein an arrangement of the two transducers 24a, 24b parallel to the longitudinal extension direction $L_M$ of the measuring tube 12 is shown here for reasons of clarity. The transducer 24a serves as the transmitter and the transducer 24b as the receiver of the surface acoustic waves OW, and the illustration of the elastic printed circuit board 32 or printed circuit board foil has been omitted. The two piezoelectric transducers 24a and 24b are attached to the measuring tube wall 22 via an adhesive layer 35.

As can be seen from the figure, a further electrode 34a' and 34b', respectively, which is arranged on the side of the piezoelectric elements 26 facing the measuring tube 12, is arranged opposite each of the electrodes 34a and 34b, which are arranged on the side of the piezoelectric elements 26 of the transducers 24a and 24b, respectively, facing away from the measuring tube 12. The electrodes 34a and 34a' or the electrodes 34b and 34 b' of each transducer 24a or 24b each form a pair of electrodes.

During operation of the piezoelectric transducers 24a, 24b, an alternating voltage is applied between the first electrode 34a or 34b and the associated second electrode 34a' or 34b of the respective pair of electrodes. Furthermore, the two first electrodes 34a and 34b and the two second electrodes 34a' and 34b' of the different pairs of electrodes are short-circuited, so that during operation, the piezoelectric elements 26 oscillate in phase in a kind of bending vibration at the points where the pairs of electrodes rest and the surface acoustic waves OW are thus generated which propagate in the measuring tube wall 22.

As can also be seen from FIG. 2, all electrodes 34a, 34a', 34b, 34b' extend parallel to a longitudinal axis $L_W$ of the respective piezoelectric transducer 24a to 24e, the two pairs of electrodes being at different distances from the longitudinal axis $L_W$. One pair of electrodes 34a, 34a' is arranged in an edge region and the other pair of electrodes 34b, 34b' is arranged in a central region of the respective piezoelectric transducer 24a to 24e.

In this way, an asymmetric propagation of the surface waves OW emitted by the piezoelectric transducer 24a is obtained, wherein on the (longest) side S of the transducer 24a, on which no pair of electrodes is directly arranged (i.e. in the desired direction of propagation of the surface acoustic waves OW), an amplitude which is up to 50% greater than on the opposite (longest) side is obtained.

As can be seen in particular from FIGS. 1 and 7B, the piezoelectric transducers 24a to 24e each rest in a planar manner against a curved section of the measuring tube wall 22 and, with respect to the center line M thereof, are arranged at an acute angle $\Theta_a$, $\Theta_b$, $\Theta_c$, $\Theta_d$, $\Theta_e$ to the longitudinal extension direction $L_M$ of the measuring tube 12. The center line M is perpendicular to the longest side I of the cuboid 30 and thus parallel to the propagation direction of the surface waves OW.

It should be noted that each piezoelectric transducer 24a to 24e encloses a different acute angle $\Theta_a$, $\Theta_b$, $\Theta_c$, $\Theta_d$, $\Theta_e$ with the longitudinal extension direction $L_M$ of the measuring tube 12 (FIG. 1).

Due to their structure of strip-shaped rigid piezoelectric elements 26 with flexible layers 28 arranged therebetween, the piezoelectric transducers 24a to 24e can also be twisted in themselves to a certain extent, which enables an ideal adaptation to the curvature of the measuring tube wall 22 when arranged obliquely to the longitudinal extension direction $L_M$ of the measuring tube 12.

Furthermore, the piezoelectric transducers 24a to 24e are arranged offset from each other in the circumferential direction U and in the longitudinal extension direction $L_M$ of the measuring tube 12.

If the measurement of characteristic properties of the fluid F in the fluid duct 18 is performed in the flow direction, the transducer 24a serves as a transmitter for exciting acoustic waves in the waveguide, while the remaining transducers 24b, 24c, 24d, 24e serve as receivers for receiving acoustic waves.

To now measure certain properties of the fluid F within the fluid duct 18, the transmitter 24a excites surface acoustic waves OW in the area of the measuring tube wall 22 directly below the transmitter 24a. These surface waves OW travel along the measuring tube wall 22 serving as a waveguide due to the orientation of the transducers 24a and 24b to each other and, with respect to the measuring tube 12, mainly in the direction towards the first receiver 24b and are detected there. The first receiver 24b thus receives a reference signal which is transmitted directly through the measuring tube wall 22 (see in particular FIG. 4A).

Due to the direct interface of the fluid F to the measuring tube wall 22, part of the energy of the surface acoustic waves OW (from the transmitter 24a) is decoupled on the inner surface of the measuring tube 12 at the interface to the fluid F, and travels from there at a specific propagation angle α (with respect to a normal to the surface of the measuring tube wall 22) as a volume wave V through the fluid F.

If the fluid F does not move in the measuring tube 12, the angle of incidence α of the volume wave V into the fluid F results from the ratio of the speed of sound $c_f$ in the fluid F to the speed of sound $c_w$ of the surface wave OW in the measuring tube wall 22 to $$\alpha = \arcsin(c_f/c_w).$$

Thus, the angle α results from the "material pairing", wherein the speed of sound $c_w$ in the measuring tube wall has to be higher than the speed of sound $c_f$ in the fluid F so that a value different from zero is obtained, below which the surface wave OW couples into the fluid F and covers therein a spatial distance as a volume wave V. The surface waves include, among others, LAMB waves, Rayleigh waves or Leaky Rayleigh waves which are used therein.

The volume wave V then hits the measuring tube wall 22 in the area of the transducer 24c serving as a second receiver, part of the energy thereof being coupled into the measuring tube 12 as a surface acoustic wave and being detected by the second receiver 24c. Consequently, the second receiver 24c is arranged on the measuring tube wall 22 so as to detect the signal of this first wave group or first wave order of the volume wave V which has propagated directly from the transmitter 24a through the fluid F without having been reflected at the measuring tube wall 22 (see in particular FIGS. 5 A-C).

Part of the energy of the volume wave V is also reflected at the measuring tube wall 22 and subsequently hits the measuring tube wall 22 again in the area of the transducer 24d. Again, part of the energy of the volume wave V couples into the measuring tube 12 as a surface acoustic wave and is detected by the third receiver 24d, which thus receives a signal of the second wave group or wave order of the volume wave V which was reflected once at the measuring tube wall 22. In this way, the volume wave V propagates through the fluid F (see FIGS. 6A-C).

The remaining portion of the volume wave V is reflected again and finally hits the measuring tube wall 22 in the area of the transducer 24e, which serves as the fourth receiver, where again part of the energy couples into the measuring tube 12 as a surface acoustic wave. This is registered by the fourth receiver 24e as the third wave group or wave order of the volume wave V which has propagated through the fluid F and has been reflected twice at the measuring tube wall 22, as can be seen in particular from FIGS. 7A-C.

From the propagation delay between a wave pulse emitted by the transmitter 24a and the signals arriving at the receivers 24b to 24e, and from the intensity and the time course thereof, conclusions can be drawn about properties of the fluid F such as the concentration, viscosity, sound velocity, flow velocity, flow rate, temperature, and homogeneity thereof.

As can be seen in particular in FIG. 7B, the piezoelectric transducers 24a, 24c, 24d and 24e are arranged along the measuring tube 12 such that two successive reflection areas of the volume wave V in the axial direction or longitudinal extension direction $L_M$ of the measuring tube 12 are arranged offset from each other by approximately 125° to 130° in the circumferential direction U.

More piezoelectric transducers can of course also be provided so that even more wave groups or orders can be measured. However, it should be noted that the signal increasingly becomes weaker with each additional receiver.

In the configuration of FIGS. 1 to 7C, the piezoelectric transducers 24a to 24e are arranged along the circular cylindrical measuring tube 12 such that the volume wave V in the fluid F travels substantially along a helical line.

Figure 3A:
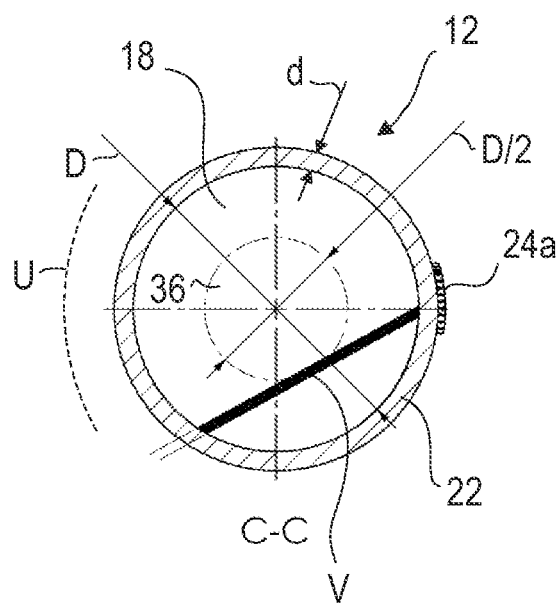
FIGS. 3A to 3D show different cross-sectional views of the fluid measuring device of FIG. 2, namely along the lines B-B for FIG. 3A, C-C for FIG. 3B, D-D for FIG. 3C and E-E for FIG. 3D.
Figure 3B:
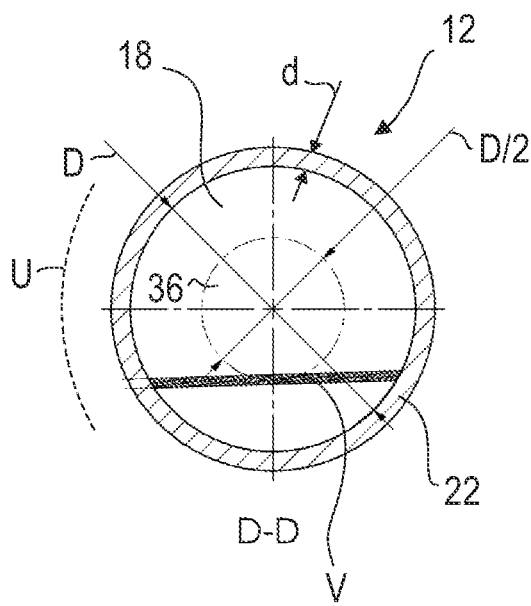
Figure 3C:
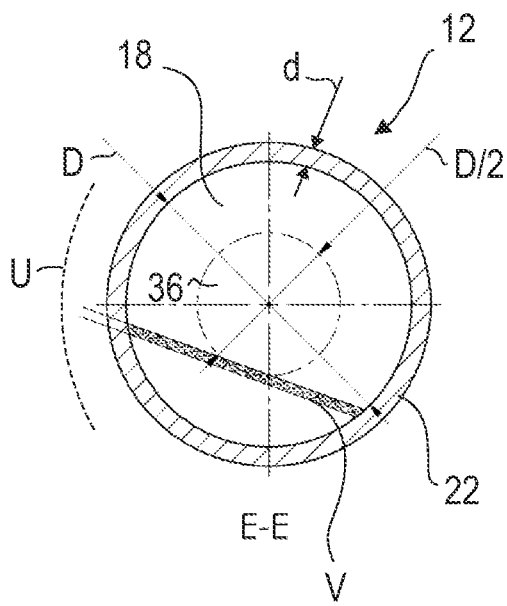

As can be seen from FIGS. 3A-D, which show various cross-sections through the measuring tube 12 in the area of the first wave group of the volume wave V, an avoidance of a central area 36 of the fluid duct 18 is achieved for the volume waves V generated in the fluid F and indicated in FIGS. 3A-C, so that no measurement of the fluid F takes place in this central area 36 of the fluid duct 18. The diameter of the central area 36 omitted by the measurement is approximately half the total diameter D of the fluid duct 18. In contrast thereto, the areas located around the central area 36 are fully detected. Measurements and simulations have shown that the best measurement results are obtained in this way.

Figure 3D:
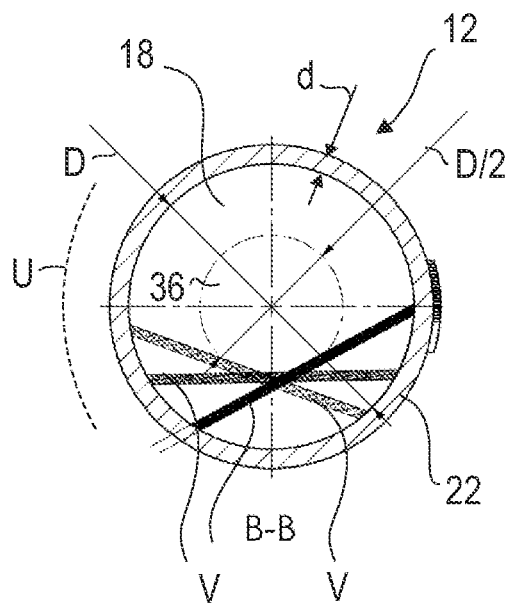

A superimposition of FIGS. 3A-C results in FIG. 3D, in which the helical waveform of the volume wave V in the fluid F and the avoidance of the central area 36 can be seen.

It can also be seen in FIGS. 3A-C that the measuring tube wall 22 has a constant wall thickness d throughout the measuring section 20.

At least the transducers 24a and 24e can be operated both as transmitters and receivers, so that in addition to a measurement in the flow direction as described so far, a measurement against the flow direction is also possible. If the measurement is realized against the flow direction, the transducer 24e is the transmitter, the transducer 24d is the first receiver, the transducer 24c is the second receiver, the transducer 24a is the third receiver, and the transducer 24b continues to be the receiver for the surface wave OW, which serves as a reference.

Figure 8:
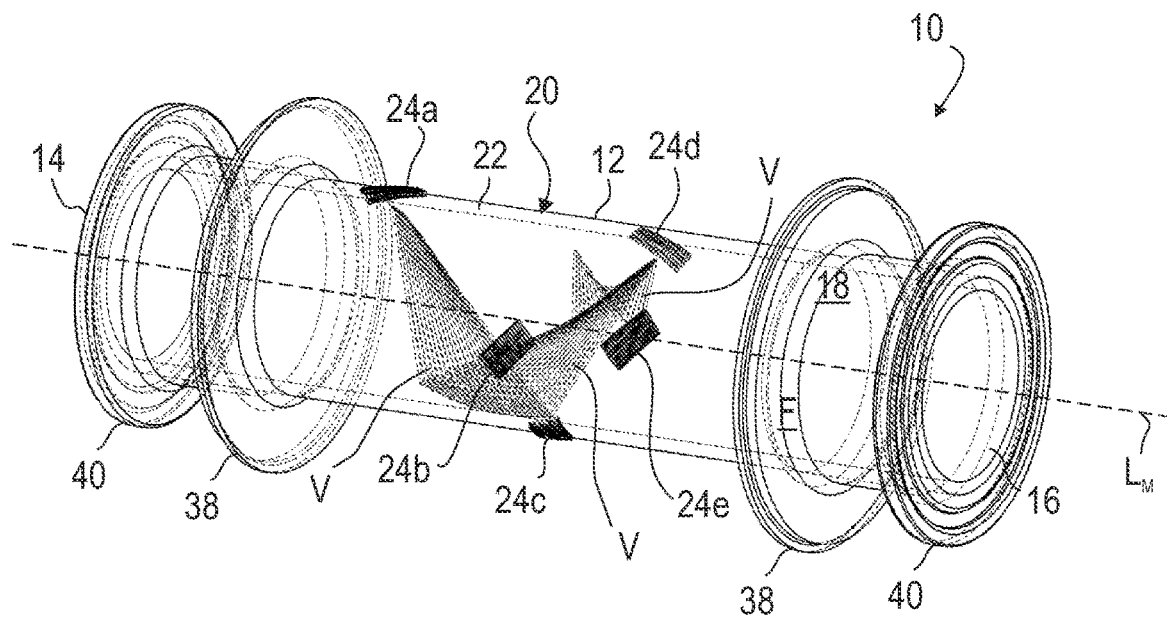
FIG. 8 shows a partially transparent perspective view of a variant of the fluid measuring device of FIG. 1.

FIG. 8 shows a slightly modified fluid measuring device 10 which differs from that of FIGS. 1 to 7 only in that a first pair of flanges 38 for attaching a sensor housing along with an evaluation electronics not shown in FIG. 8, and a second pair of flanges 44 for integrating the fluid measuring device 10 into a pipe network are provided on the measuring tube 12 adjacent to the measuring section 20.

Figure 10:
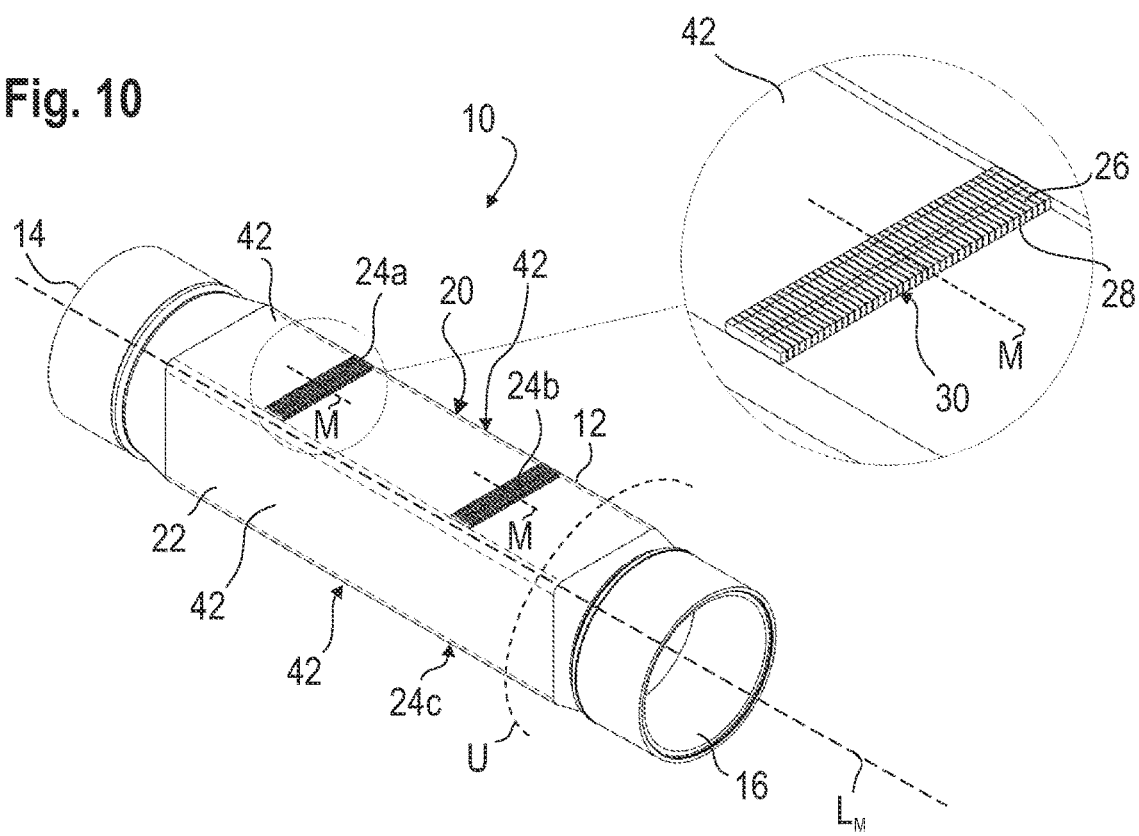
FIG. 10 shows a perspective view of a second embodiment of a fluid measuring device according to the invention during assembly of the piezoelectric transducers.
Figure 11:
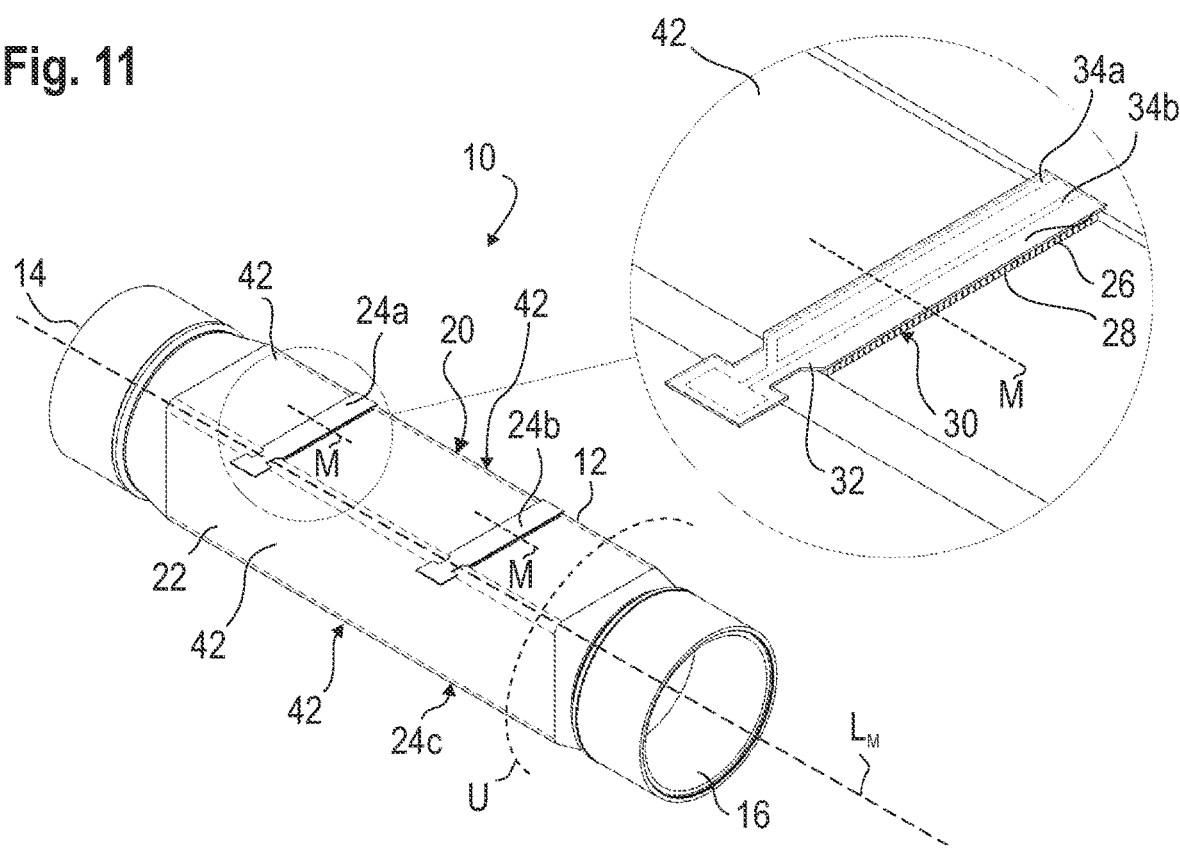
FIG. 11 shows a perspective view of the fluid measuring device of FIG. 10 after the piezoelectric transducers have been mounted.

FIGS. 10 and 11 show a second embodiment of the fluid measuring device 10 according to the invention, identical components bearing identical reference signs, and only the differences to the embodiment described so far being discussed below.

In the fluid measuring device 10 according to FIGS. 10 and 11, the measuring tube 12 in the measuring section 20 is substantially rectangular in cross-section, the corners being slightly rounded. Thus, the measuring tube 12 has a total of four flat sides 42 to which the piezoelectric transducers are attached.

In this configuration, two transducers 24a and 24b are provided on the top flat side 42 shown in FIGS. 10 and 11, and one transducer 24c is provided on the lower flat side 42 not visible in the figures.

All transducers 24a to 24c are arranged with their center line M parallel to the longitudinal extension direction $L_M$ of the measuring tube 12 and extend over at least 90% of the width of the fluid channel 18, here even over the entire width thereof.

In this embodiment, the length l of the transducers 24a to 24c is approximately six times the width b thereof (see FIG. 9). The transducers 24a to 24c are approximately 80 mm long and, since they rest against the flat sides 42 of the measuring tube 12, are not bent in the mounted state.

When mounting the transducers 24a to 24c, first the cuboid 30 consisting of the strip-shaped rigid piezoelectric elements 26 and the layers 28 of elastic material arranged therebetween is bonded to the measuring tube wall 22 (FIG. 10), and then the printed circuit board 32 or printed circuit board foil together with the electrodes 34a, 34b is attached thereto (FIG. 11), which incidentally also applies to the previously described embodiment.

Figure 12:
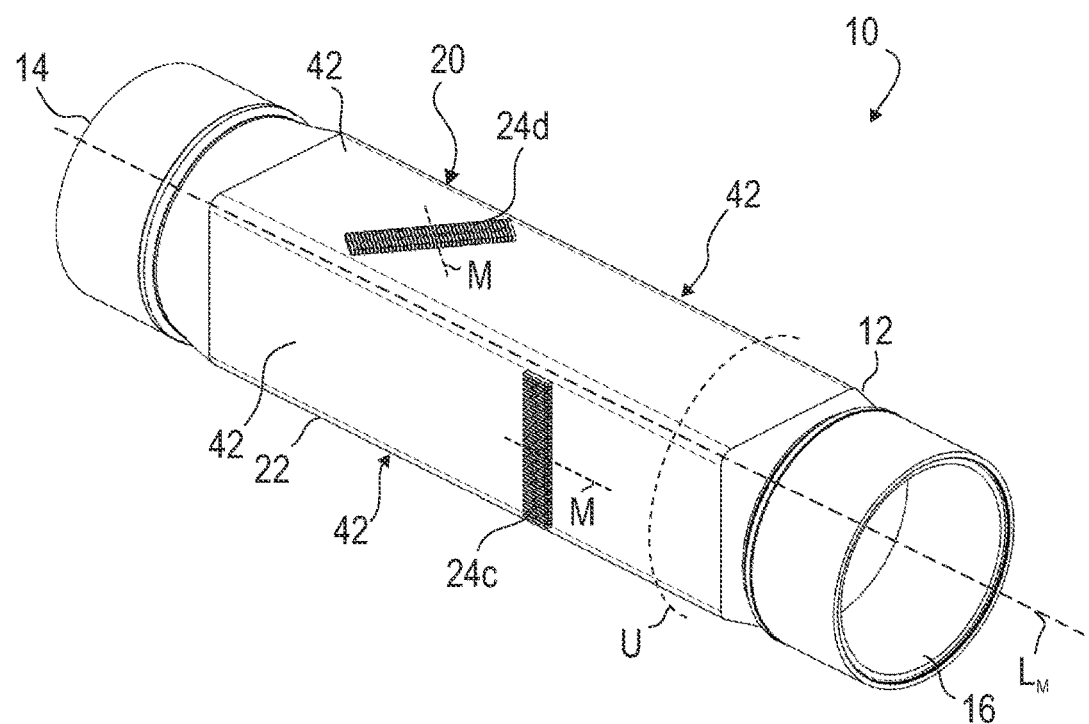
FIG. 12 shows a perspective view of a third embodiment of a fluid measuring device according to the invention during assembly of the piezoelectric transducers.
Figure 13:
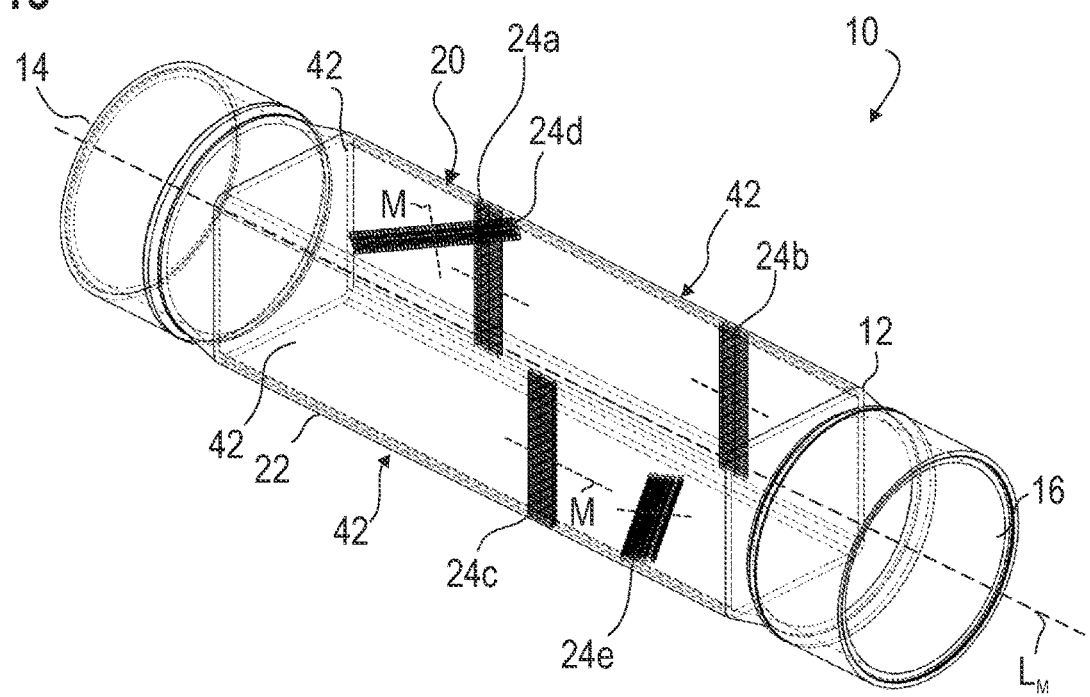
FIG. 13 shows a partially transparent perspective view of the fluid measuring device of FIG. 12.

FIGS. 12 and 13 show a third embodiment of the fluid measuring device 10 according to the invention, which differs from the embodiment of FIGS. 10 and 11 only in the number and arrangement of the piezoelectric transducers.

Here, three piezoelectric transducers 24a to 24c, which are arranged with their center line M parallel to the longitudinal extension direction $L_M$ of the measuring tube 12, are combined with two transducers 24d and 24e which are arranged 12 on the measuring tube wall 22 obliquely to the longitudinal extension direction $L_M$ of the measuring tube, a helix-like propagation of the volume wave in the fluid F being thus achieved.

Figure 15:
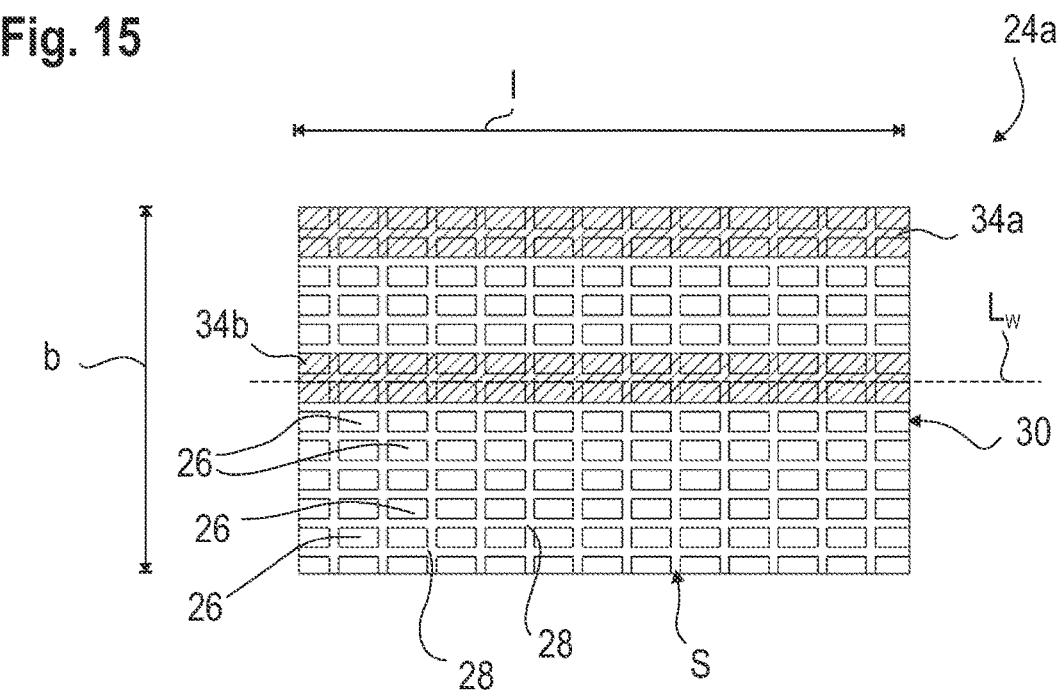
FIG. 15 shows a top view of an alternative configuration of a piezoelectric transducer for a fluid measuring device according to the invention.

Finally, FIG. 15 shows an alternative configuration of a piezoelectric transducer 24a which may be used in place of the transducers 24a to 24e shown in the other figures.

In the piezoelectric transducer 24a of FIG. 15, the strip-shaped rigid piezoelectric elements 26 and the layers 28 of elastic material arranged therebetween alternate as seen both in the longitudinal direction and in the transverse direction of the cuboid 30. This results in a structure of thin plate-like piezoelectric elements 26 having an elongated shape and separated from each other by a grid of elastic material, so that improved flexibility is achieved.

Other arrangements of the piezoelectric transducers than shown in the figures are of course also possible; in particular, combinations of obliquely arranged flexible transducers with arrangements known from the prior art are conceivable.

The invention claimed is:

1. A fluid measuring device for determining at least one characteristic property of a fluid, comprising:
   a measuring tube having a fluid duct through which the fluid can flow and which has a measuring section in which at least an area of a measuring tube wall is configured as a waveguide for surface acoustic waves which forms an interface to the fluid, the measuring tube being configured to be cylindrical on an inside, and at least three piezoelectric transducers which are arranged in direct contact with an outer surface of the waveguide and one of which serves as a transmitter for exciting acoustic waves in the waveguide and at least two serve as receivers for receiving acoustic waves, wherein the acoustic waves excited by the transmitter can propagate at least in sections as a volume wave through the fluid, wherein the at least three piezoelectric transducers are configured to be elastically flexible while retaining their function in that the at least three transducers have a plurality of strip-shaped piezoelectric elements which are arranged parallel to each other, are rigid per se and between which a respective layer of an elastic material is arranged, wherein the at least three piezoelectric transducers rest in a planar manner against the measuring tube wall, and wherein the at least three piezoelectric transducers, with respect to a center line thereof, are each arranged at an acute angle to a longitudinal extension direction of the measuring tube and, in addition, are arranged offset from each other in a circumferential direction and in the longitudinal extension direction of the measuring tube.

2. The fluid measuring device according to claim 1, wherein the at least three transducers are bonded to the measuring tube wall.

3. The fluid measuring device according to claim 1, wherein the elastic material is an elastomer or casting compound.

4. The fluid measuring device according to claim 1, wherein the strip-shaped rigid piezoelectric elements and the layers of the elastic material arranged therebetween substantially form a cuboid in a non-bent state, a length of the cuboid being at most ten times a width thereof, and a height being approximately one tenth of the width.

5. The fluid measuring device according to claim 4, wherein the strip-shaped rigid piezoelectric elements and the layers of the elastic material arranged therebetween alternate as seen in a longitudinal direction of the cuboid and each of the strip-shaped rigid piezoelectric elements extends over an entire width of the cuboid.

6. The fluid measuring device according to claim 4, wherein the strip-shaped rigid piezoelectric elements and the layers of the elastic material arranged therebetween alternate as seen both in a longitudinal direction and in a transverse direction of the cuboid.

7. The fluid measuring device according to claim 1, wherein the at least three piezoelectric transducers have an elastic printed circuit board or printed circuit board foil to which the strip-shaped piezoelectric elements are fastened and electrically contacted.

8. The fluid measuring device according to claim 7, wherein the at least three piezoelectric transducers each have two electrodes which are mounted on the elastic printed circuit board or the printed circuit board foil and are arranged such that the acoustic wave is coupled into the measuring tube or received therefrom via a longest side of the piezoelectric transducer.

9. The fluid measuring device according to claim 1, wherein the measuring tube wall has a substantially constant wall thickness throughout the measuring section.

10. The fluid measuring device according to claim 1, wherein the at least three piezoelectric transducers, with respect to the respective center line thereof, are arranged at different acute angles to a longitudinal extension direction of the measuring tube.

11. The fluid measuring device according to claim 1, wherein a first receiver is arranged on the measuring tube wall so as to receive a signal of an acoustic wave transmitted directly via the measuring tube wall serving as a waveguide, and in that a second receiver is arranged on the measuring tube wall so as to receive the signal of an acoustic wave which has propagated in sections as a volume wave through the fluid without having been reflected at the measuring tube wall.

12. The fluid measuring device according to claim 11, wherein at least one further receiver is provided and arranged on the measuring tube wall so as to receive the signal of an acoustic wave which has propagated in sections as a volume wave through the fluid and has been reflected at least once on the measuring tube wall.

13. The fluid measuring device according to claim 1, wherein at least five piezoelectric transducers are provided.

14. The fluid measuring device according to claim 1, wherein the at least three piezoelectric transducers are arranged along the measuring tube such that two successive reflection areas of the volume wave in the longitudinal extension direction of the measuring tube are arranged offset from each other by less than 180° in the circumferential direction.

15. The fluid measuring device according to claim 1, wherein the at least three piezoelectric transducers are arranged along the measuring tube such that two successive reflection areas of the volume wave in the longitudinal extension direction of the measuring tube are arranged offset from each other by 125° to 130° in the circumferential direction.

16. The fluid measuring device according to claim 1, wherein the measuring tube in the measuring section is substantially rectangular in cross-section and has flat sides to which the at least three piezoelectric transducers are attached.

17. The fluid measuring device according to claim 16, wherein the at least three piezoelectric transducers extend over at least 90% of a width of the fluid duct.

18. The fluid measuring device according to claim 1, wherein at least two of the at least three piezoelectric transducers can be operated both as transmitters and as receivers.

19. A fluid measuring device for determining at least one characteristic property of a fluid, comprising:

a measuring tube having a fluid duct through which the fluid can flow and which has a measuring section in which at least an area of a measuring tube wall is configured as a waveguide for surface acoustic waves which forms an interface to the fluid, and at least two piezoelectric transducers which are arranged in direct contact with an outer surface of the waveguide and one of which serves as a transmitter for exciting acoustic waves in the waveguide and at least one as a receiver for receiving acoustic waves, wherein the acoustic waves excited by the transmitter can propagate at least in sections as a volume wave through the fluid, wherein the at least two piezoelectric transducers are configured to be elastically flexible white retaining their function in that the at least two piezoelectric transducers have a plurality of strip-shaped piezoelectric elements which are arranged parallel to each other, are rigid per se and between which a respective layer of an elastic material is arranged, wherein each of the at least two piezoelectric transducers has at least two pairs of electrodes, a first electrode of a pair of electrodes being arranged on a side of the piezoelectric elements facing away from the measuring tube and a second electrode of the same pair of electrodes being arranged on a side of the piezoelectric elements facing the measuring tube and opposite the first electrode, and a voltage being applied between the first electrode and the second electrode of the pair of electrodes during operation of the piezoelectric transducer, wherein the electrodes of different pairs of electrodes arranged on a same side of the piezoelectric elements are short-circuited, wherein all electrodes run parallel to a longitudinal axis at the piezoelectric transducer and the at least two pairs of electrodes have different distances from the longitudinal axis, one pair of electrodes being arranged in an edge region and one pair of electrodes being arranged in a central region of the piezoelectric transducer, so that the piezoelectric transducer has an asymmetrical arrangement of electrode pairs with respect to its longitudinal axis.

20. A fluid measuring device for determining at least one characteristic property of a fluid, comprising:

a measuring tube having a fluid duct through which the fluid can flow and which has a measuring section in which at least an area of a measuring tube wall is configured as a waveguide for surface acoustic waves which forms an interface to the fluid, the measuring tube being configured to be cylindrical on an inside, and at least three piezoelectric transducers which are arranged in direct contact with an outer surface of the waveguide and one of which serves as a transmitter for exciting acoustic waves in the waveguide and at least two serve as receivers for receiving acoustic waves, wherein the acoustic waves excited by the transmitter can propagate at least in sections as a volume wave through the fluid, wherein the at least three piezoelectric transducers are configured to be elastically flexible while retaining their function in that the at least three piezoelectric transducers have a plurality of strip-shaped piezoelectric elements which are arranged parallel to each other, are rigid per se and between which a respective layer of an elastic material is arranged, wherein the at least three piezoelectric transducers rest in a planar manner against the measuring tube wall, wherein the at least three piezoelectric transducers, with respect to a center line thereof, are each arranged at an acute angle to a longitudinal extension direction of the measuring tube and, in addition, are arranged offset from each other in a circumferential direction and in the longitudinal extension direction of the measuring tube, wherein the at least three piezoelectric transducers are arranged along the measuring tube which is circular-cylindrical in the measuring section, such that the volume wave in the fluid travels substantially along a helical line, and a central area of the fluid duct is omitted by the volume wave.

21. The fluid measuring device according to claim 20, wherein a diameter of the central area corresponds to half a diameter of the fluid duct.

* * * * *